United States Patent [19]

Alhalabi

[11] Patent Number: 5,781,702
[45] Date of Patent: Jul. 14, 1998

[54] HYBRID CHIP-SET ARCHITECTURE FOR ARTIFICIAL NEURAL NETWORK SYSTEM

[76] Inventor: Bassem A. Alhalabi, P.O. Box 54594, Lafayette, La. 70505

[21] Appl. No.: 477,676

[22] Filed: Jun. 7, 1995

[51] Int. Cl.[6] .................................................. G06F 15/18
[52] U.S. Cl. ............................ 395/24; 395/11; 395/21
[58] Field of Search ............................... 395/24, 27, 11, 395/20–23; 382/155–160

[56] References Cited

U.S. PATENT DOCUMENTS

| | | | |
|---|---|---|---|
| 4,710,903 | 12/1987 | Hereth et al. | 365/194 |
| 5,298,796 | 3/1994 | Tawel . | |
| 5,299,286 | 3/1994 | Imondi et al. . | |
| 5,479,579 | 12/1995 | Duong et al. | 395/27 |

OTHER PUBLICATIONS

Wang et al. "A Modular Analog CMOS LSI for Feedforward Neural Networks with On-Chip BEP Learning." Circuits and Systems, 1993 IEEE Int. Symp., pp. 2744–2747, May 31, 1993.

Alhalabi et al. "A slice of a brain: A hybrid neural chip set," Circuits and Systems, 1994 Midwest Symposium, vol. 1, pp. 489–494, Dec. 20, 1994.

B.A. Alhalabi & M.A. Bayoumi. A hybrid chip set for neural networks. *Proceedings of World Congress on Neural Networks*, vol. II:pp. 624–630, San Diego, CA., Jun. 6,1994.

B.E. Boser & E. Sackinger. An analog neural network processor with programmable topology. *IEEE journal of Solid–State Circuits*, vol. 26(No. 12):pp.2017–2025, Dec. 1991.

M. Holler & S. Tam. An electrically trainable artificial neural network (etann) with 10240 "floating gate" synapses. *International Joint Conference on Neural Networks*, vol. II:pp. 191–196, Jun. 1989.

M. Nahebi & B. Wooley. A 10–bit video bicmos track–and–hold amplifier. *IEEE Journal of Solid–State Circuits*, vol.SC–24 (No.6):pp.1507–1516, Dec. 1989.

E. Sackinger & W. Guggenbuhl. An analog trimming circuit based on a floating–gate device. *IEEE Journal of Solid–State Circuits*, vol.SC–23(No.6):pp.1437–1440, Dec. 1988.

S. Satyanarayana & Y.P. Tsividis. A reconfigurable vlsi neural network. *IEEE Journal of Solid–State Circuits*, vol.27(No.12):pp. 1868–1876, Dec. 1992.

T.Shima & T. Kimura. Neuro chips with on–chip back–propagation and/or hebbian learning. *IEEE Journal of Solid–State Circuits*. vol.27(No.12):pp.1868–1876, Dec. 1992.

J.V. Spiegel & P. Mueller. An analog neural computer with modular architecture for real–time dynamic computations. *IEEE Journal of Solid–State Circuits*, vol.27(No.1):82–92, Jan. 1992.

E. Vittoz & e. a. H. Oguey. *VLSI Design of Neural Networks*, edited by U. Ramacher & U. Ruckert, chapter Analog Storage of Adjustable Synaptic Weights. Kluwer Academic Publishers, Boston, Massachusetts, 1991.

G. Wegmann, E. Vittoz & F. Rhali. Charge injection in analog mos switches. *IEEE journal of solid–State Circuits*, vol.SC–22 (No.6):pp.1091–1097, Dec. 1987.

*Primary Examiner*—Tariq R. Hafiz
*Attorney, Agent, or Firm*—Robert N. Montgomery

[57] ABSTRACT

A self-contained chip set architecture for ANN systems, based on back-propagation model with full-connectivity topology, and on-chip learning and refreshing, based on analog chip set technology providing self-contained synapse and neuron modules with fault tolerant neural computing, capable of growing to any arbitrary size as a result of embedded electronic addressing. Direct analog and digital I/O ports allow real-time computation and interface communication with other systems including digital host of any bus bandwidth. Scalability is provided, allowing accommodation of all input/output data sizes and different host platform.

13 Claims, 10 Drawing Sheets

HYBRID CHIP-SET ARCHITECTURE FOR ARTIFICIAL NEURAL NETWORK SYSTEM

BACKGROUND OF THE INVENTION

1. Field of the Invention

This invention relates to electronic circuitry associated with neural networks and more particular to computer chip set architecture having on board learning capability and refreshing.

2. General Background

Artificial neural networks, ANNs, have demonstrated their potential for addressing nonlinear applications such as speech and vision. "ANN" processing manifest itself by emulating the human brain structure having recognition capability, i.e. the ability to distinguish one name from another far surpassing the computation capability of simply adding strings of numbers. The success found in artificial neural networks is still limited by their efficiency in performing basic ANN computations and their capability of acquiring large networks having a high degree of connectivity. The gap between what is needed and what is currently available in the industry is solely due to the fact that spatia-temporal parallelism (inherent to biological systems) is entirely or partially lost in digital machines.

Recently, significant contributions have been made in analog neural networks which utilize new design techniques and/or architectures for some of the specific elements within the networks. However, such architectures lack scalability, direct neural I/O ports for real-time applications, on-chip learning (or no learning at all), data conversion, and/or real analog storage and handling. Therefore, a need for a new class of scalable and modular architecture for neural systems based on the chip-set approach exist. Moreover, total analog solutions are required for both data storage and processing in any attempt to emulate the data flow in the human biological brain.

III. Comparison to Previous work

Analog Synaptic Storage and Refreshing

Synaptic weight storage has been the most challenging design issue in analog neural network paradigm especially where on-chip learning is required. The analog weight value, stored on a capacitor for example, must be made adjustable through some switching techniques, such as transistors, associated with the capacitor. Such transistor association breeds an unpleasant leakage which inevitably shortens the life of the weight storage. Therefore, refreshing mechanisms have evolved. In some cases the problem may be overcome with digital static RAM which does not require refreshing hardware. However, if analog functional units are to be used due to their superiority, then all digital weights must be converted to analog. Such conversion necessitates that each synapse must be equipped with a DAC and/or ADC. This trade off between digital storage with DAC/ADC and analog storage with refreshing dictates the need for new techniques for weight storage and refreshing.

Others in the art have advocated the use of analog storage for the synaptic weights so that they eliminated the need for weight conversion from digital to analog and vice versa. However, such techniques, do not support on-chip learning therefore, the synaptic weight need not be modifiable. This technique enables one to use external RAM to permanently store all the weights and sequentially reload (refresh) them to the analog capacitors through on-chip DACs. However, this approach not only makes learning impossible to incorporate on a chip, but it also makes dynamic learning extremely slow to implement as a host procedure. These difficulties arise specifically from the need to modify the statically stored weights in accordance to dynamically generated weight graded updates. Another method of synaptic storage handling known within the art, involves digital storage without refreshing or the addition of DACs. This technique uses a 6-bit digital weight as an on/off multiplying switching pattern and a current split/recombine mechanism. Although this approach of weight storage and handling is more conservative on the silicon area than others, it does however, make learning too inefficient to be incorporated on chip due to the large size of hardware that would be required.

In comparison to the preceding schemes, The present invention uses all analog components. The present invention uses capacitors to store weights as voltages and a new analog technique to refresh them on the chip. Graded update signals are generated in analog and added to the weights via simple local analog adders. Localization of weight update makes the burden size of the learning procedure on the digital host minimal and independent of the overall network size, an advantage that permits an arbitrarily large size of neural networks. In contrast, the prior art's use of external or internal digital storage creates a significant data transfer, bandwidth, bottleneck during weight updates, especially with large networks. Although it is known that analog quantities may be observed in various forms, however, the most natural way for a weight representation to be made is to store it as a charge across an integrated capacitor.

On-Chip Learning

Hardware support for on-chip learning greatly overtaxes the silicon area of the neural system and substantially affects the formation of the architecture. Therefore, based on particular applications, many in the art have found it more efficient to leave the learning procedure to the host and spare the entire chip area for massively integrated and extremely fast and compact neural processors. However, sub-micron integration technology plus the vast amount of activities in the art struggling to improve analog techniques and tools, have greatly facilitated the realization of on-chip learning.

On-chip learning is essential in applications where learning new patterns is frequently needed and must be dynamically performed.

Due to the regularity, data flow patterns and widespread applications of back propagation, we used it as main bearing algorithm.

Although the use of analog functional blocks to perform weight multiplication and product summation is known in the art, weight update is implimented using digital components. For every synapse body, there is an 8-bit weight register (WR) and a 1-bit ADC. The WR holds the weight and its local DAC converts its value to an analog signal to be used by analog functional units. When the analog weight graded update is generated at every synapse body, it is converted into digital by the 1-bit ADC with high approximation. This bit, through some learning control, is used to digitally increase/decrease the WR value. Because the weight is stored in a digital register, its graded updates must be digitally computed and imposed which requires an additional ADC and a digital adder for each synapse. This would significantly increase the silicon area, and therefore, in most previous art is to time-share has been used system having only one learning control circuit for every whole matrix of 64 synapses. The update procedure (10 steps) is implemented by firmware and sequentially applied to synapses, a relatively slow sequential technique within each group of 64 synapses.

TABLE 1

Comparisons of Design Properties of Various Analog ANN

| | Weights | | Learning | | |
|---|---|---|---|---|---|
| Papers & Authors | Storage Mechanism | Refreshing Method | Methodology | Control (Speed) | Weights Updating |
| Our Proposal | - Ang Capacitor | - Microscopic with ind clock<br>- Special HW in Synapse Module<br>- Sense 32 Synapses @ 1C, Compare to 16-level reference Correct to the upper bound Repeat 32 time for whole chip | - On-Chip HW<br>- BP<br>- Batch or Pattern | - HW<br>1 to 1<br>(Fast) | - 1-Step Analog Procedure<br>$\delta_i[l] = f'(h_i[l]) \sigma_i[l]$<br>$\sigma_i[l] = \Sigma_j \delta_j[l+1] \omega_{ji}[l+1]$ |
| T. Shima JSSC 92 \|10..Shim\| | - 8-b register & 8-b DAC | - Not applicable | - On-Chip HW & FW<br>- BP & Hebbian<br>- Batch only | - HW<br>1 to 64<br>(Slow) | - 10-Step Digital Procedure<br>$\Delta\omega_{ij} = \delta_j X$ o, on-chip<br>Quantized by l-b ADC<br>Inc/Dec 8-b momentum counter<br>$(\Sigma\Delta\omega_{ij})$<br>update 8-b wieght using the counter<br>One counter for 64 syn \|9 S @ 10C\| |
| B. Boser JSSC 91 \|4..Bose91\| | - Ang Capacitor and ext RAM | - Ext control with ind clock<br>- 2 DACs on chip (6-b) connected to ext weight RAM | - Host Algoritm | - Host | - Not supported<br>Host sequential procedure |
| J. V. Spiegel JSSC 92 \|11..Spie92\| | - 6-b shift register | - Not applicable | - Host Algoritm | - Host | - Not supported<br>Host sequential procedure |
| M. Holler IJCNN 89 \|5..Holl89\| | - Diff Volt EEPROM cells | - Not applicable | - Host Algoritm | - Host | - Not supported<br>Host sequential procedure |
| S. Satyanarayana JSSC 92 \|9..Saty92\| | - Ang Capacitor | - Same as updating | - Host Algoritm<br>- Gradient-Based Learning | | - Digital data from host<br>- 8 DACs off chip<br>- 8 wieght update at a time |

Notes:
ind = independent   Diff = Differential   ext = external   @/nC = at a time and every time takes n clock cycles In contrast to the above examples of the prior art (See Table 1. for more detailed comparisons), the present invention uses all analog components for the learning algorithm. The graded update signal after its generation within each synapse body, is recognized in analog as a small voltage signal and added to the weight (which is also stored as a voltage) by a voltage adder. Although the learning procedure is all in analog mode, its control, however, is still digital but is very insignificant in area and the whole update procedure for the entire system is one step.

The advantage of full analog learning is two folds. First, it does not have time-shared digital components; the characteristic which explores the true natural parallelism of neural networks. Second, analog learning technique is relaxed from the sequential nature of digital procedures; the advantage of which emphasizes the spontaneity of analog component behavior. These two significant benefits add to the overall speed of on-chip learning systems. Moreover, on-chip learning conserves error and update signals in their full analog range without any approximation (except for marginal leakage) providing much more precision and faster learning sessions. Furthermore, although neural computations in the recall and learning operations are all performed in analog mode, they can be selectively and continuously monitored by the digital host through on-chip supported hardware.

4. SUMMERY OF THE INVENTION

The present invention is a full analog architecture is based on two distinct chips having two levels, a SynChip and a NeuChip. The NeuChip comprises 32 analog neuron modules (NeuMod) and a digital control block (NeuLogic), the SynChip comprises an array of 32×32 analog synapse modules (SynMod), a digital control block (SynLogic), a voltage reference of 16 levels, and 32 refreshing blocks (RefMod). These two chips may be cascaded on a regular grid to build a neural network of any arbitrary input, output, and/or layer sizes. The two chips are interconnected when forming large networks. Neural signals flow freely between SynChip and NeuChip chips inside these chips, controlled by analog passive switches (synapse switches, SS) in the SynMod and (neuron switches, NS) in the NeuMod to interact with the other active functional blocks in the structure. These SS and NS switches are utilized to incorporate learning, using the same wires for the recall phase.

Analog technology is adopted for use in a 2-chip set architecture along with its algorithms to providing a self-contained neural processing system. The entire ANN computations within the proposed modules are performed in analog. It is these analog operations of the processing components which provide a natural implementation of neural models as it loosely emulates the data flow of the biological brain. Digital circuits are employed to facilitate the interface and communications with conventional digital hosts. Thereby combining both analog and digital technologies to provide an optimal chip set design for neural systems.

It is therefore an object of the present invention to provide a complete self-contained chip set for ANN systems based on back propagation model with on-chip learning.

A further object of the present invention is to provide an architecture design for a two-chip set combining both digital and analog systems.

It is still a further object of the present invention to provide a chip set which performs neural computations in analog mode and interfaces and communicates with host and I/O systems digitally.

Another object of the present invention is to provide a chip-set which provides expendability to arbitrary network sizes.

Yet another object of the invention is to provide scalability thereby allowing the accommodation of all input/output data sizes and the ability to hock to any digital host of any bandwidth.

Still another object is to provide a new embedded global addressing technique thereby eliminating the need for any external addressing hardware thus eliminating any restriction on the size of the overall neural system with regard to data transfer bandwidth, being bound only by the maximum bandwidth of the digital host.

A further object is to provide a neural system of any arbitrary size to be constructed from the two-chip set disclosed herein without the use of any external chip of any kind.

Yet another object is to provide a system which uses capacitors to store weights as voltages and add graded update, analog signals to these weights via simple analog adders.

Another object of the present invention is to provide refreshing which is chip-local therefore, being independent of the host.

Still another object of the present invention is to provide on-chip unicycle analog learning through the use of graded updates generated and imposed in analog without any internal conversion, thereby reserving the full scale accuracy of the analog signals without time shared digital components.

Another object of the invention is to provide continuous analog mode thus allowing the digital host to stand off-line while the neural network continues its operation in analog mode.

It is still another object of the present invention to provide architecture for building a fast neural system capable of real-time computations having neuron chips which provide both analog and digital representation of both input and output data, thereby allowing the direct analog and digital I/O ports to grow correspondingly with the system and furthermore the growing system is always operational in full parallelism.

A further object of the invention is to provide the disclosed chip architecture with a Stand-by Mode whereby all switches in all synapse and neuron modules are turned off thus providing for power saving.

5. BRIEF DESCRIPTION OF THE DRAWINGS

For a further understanding of the nature and objects of the present invention, reference should be had to following detailed description taken in conjunction with the accompanying drawings, in which, like parts are given like reference numerals, and wherein.

6. DETAILED DESCRIPTION OF THE EMBODIMENT

The present invention is a hybrid self-contained ANN system for back propagation model, combining both digital and analog technologies.

It should be noted in referencing the figures, solid lines representing connecting wires carry digital signals, whereas the doted lines carry analog signals. Analog signals having arrows indicate the direction of the signal flow. Line thickness is loosely proportional to the number of signals transmitted by that line. Finally, all directive clauses used in this disclosure such as horizontally, vertically, left to right, and top-down, are relatively in tact when viewing a particular layer of the 2-chip set system as shown in the Figures as labeled.

6.1 General Organization

Figure 1:
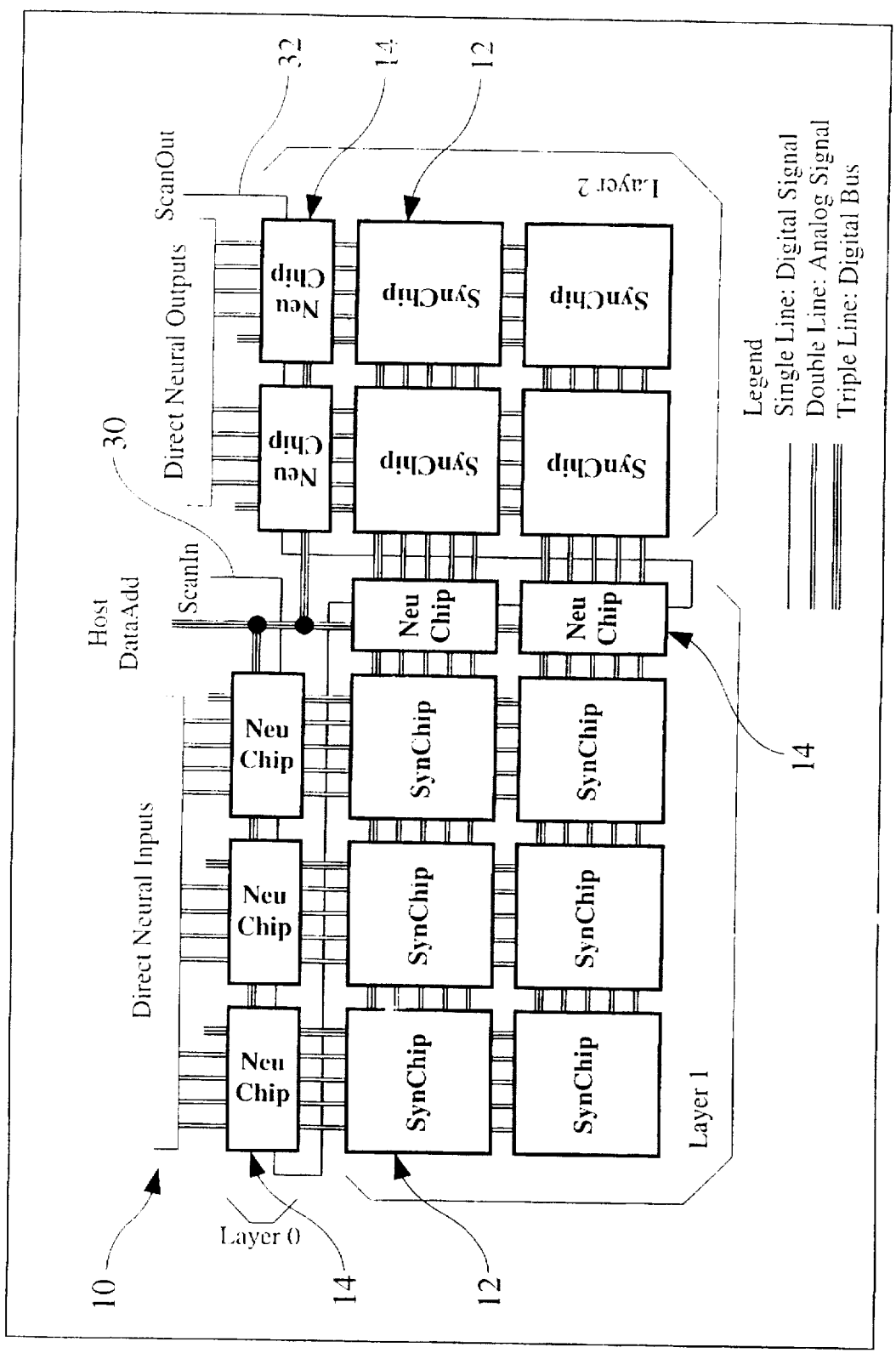
FIG. 1 is a general system organization showing an arrangement example of 2-layer perception.

The preferred architecture 10 as depicted in FIG. 1 is based on the technology of two distinct chips, a Synaptic Chip (SynChip) 12 and a Neural Chip (NeuChip) 14. These two chips 12,14 may be cascaded in a regular-grid fashion to build an ANN of any arbitrary input, output, and layer sizes as illustrated in FIG. 1. FIG. 1 shows a network of two layers the first layer 1 consisting of two rows of three SynChips 12 and two NeuChips 14 one for each row and the second layer 2 consisting of two rows of two SynChips 12 and two NeuChips 14, one for each row. Layer 0 (combined with layer 1) has only NeuChips 14. To expand the input bandwidth of the network, more columns of one NeuChip 14 and two SynChips 12 may be appended to the left side of the network and with each new column, 128 digital (32 analog) direct inputs are added. This same analogy applies to the expansion of the output bandwidth at the right side of the network. Moreover, with input and output bandwidth remaining the same, the network can be expanded vertically to increase the size of the synaptic weight matrix for higher accuracy and greater memorization capacity. This is achieved by appending more rows comprising one NeuChip 14 and five SynChips 12 to the bottom of the network.

Figure 2:
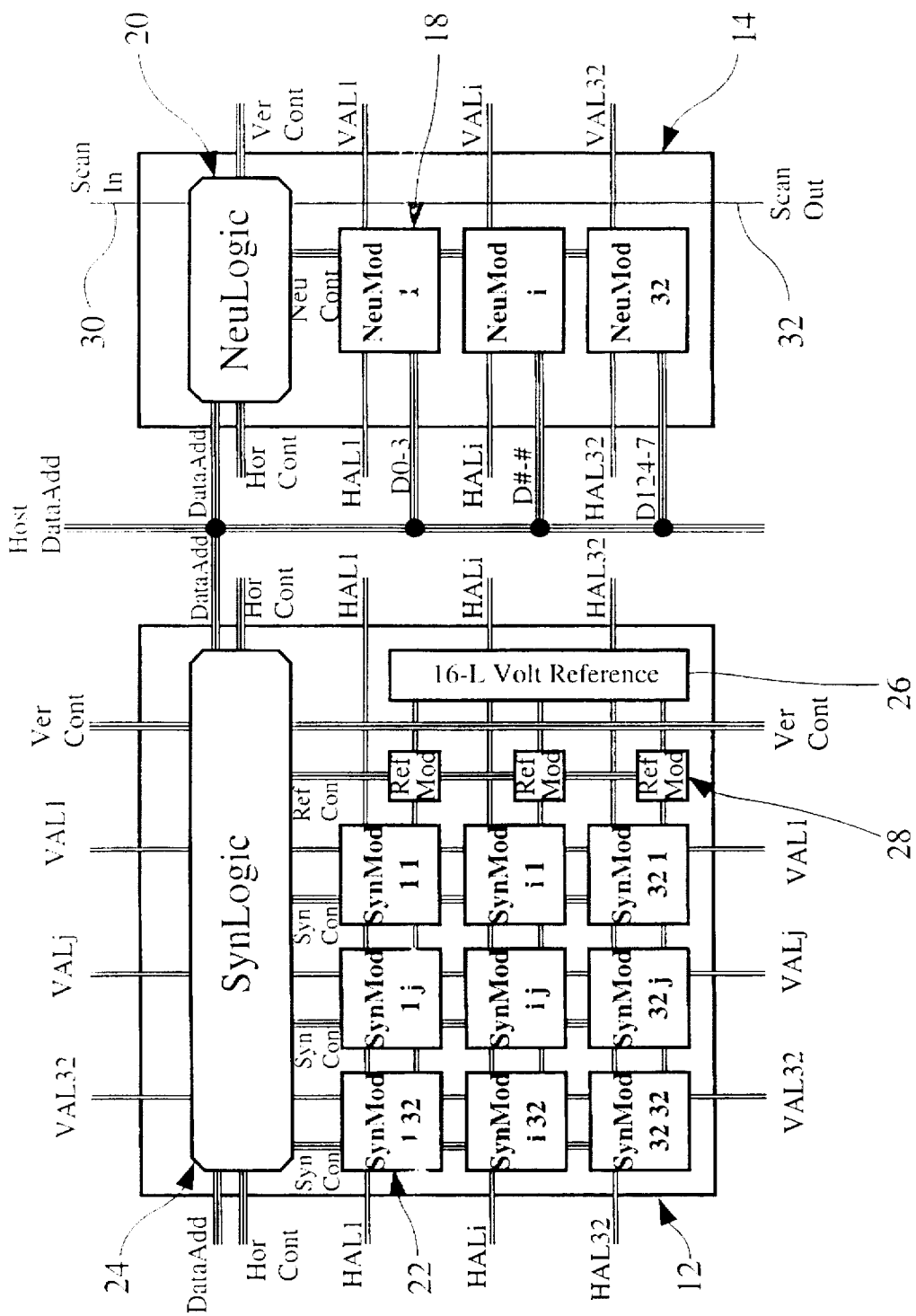
FIG. 2 is an illustration of the synapse and neuron chip internal structures and Pin Assignments.

The chips 12,14 are connected only side to side for simple Printed Circuit Board or Multi Chip Module fabrication. Furthermore, the SynChip 12 is necessarily square as to appropriate the side-to-side connection with the NeuChips 14 from both top and right sides as shown in FIG. 2. This also requires the length or height of the NeuChip 14 to be compatible with the square side of the SynChip 14. Simplicity and readiness is readily achieved through the use of such a partial analog systems.

6.2 SynChip and NeuChip, Synapse and Neuron Chips

The block diagrams of the SynChip 12 and NeuChip 14 and their interconnection relationships are depicted in FIG.

Figure 9:
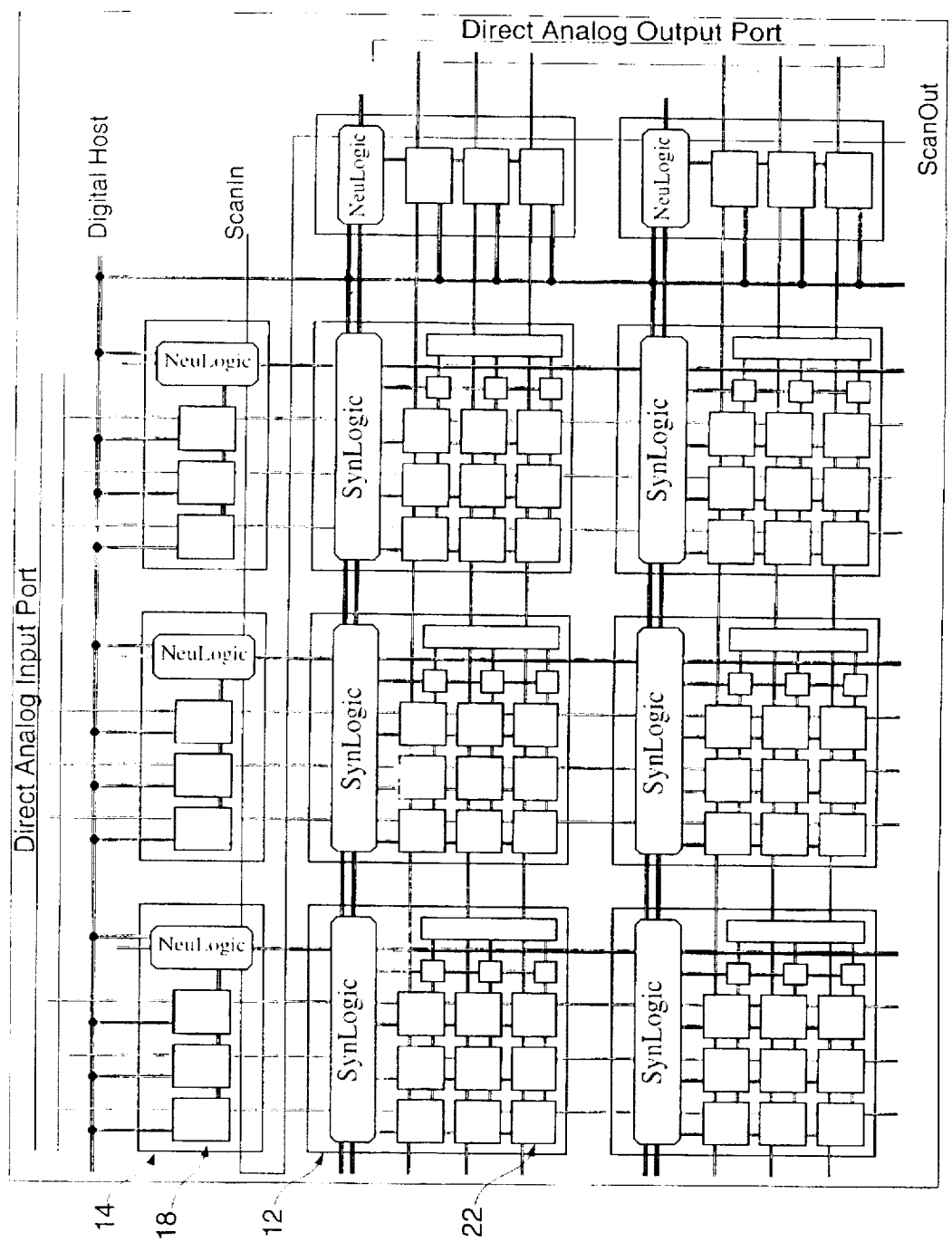
FIG. 9 is an example of a 2×3-SynChip 1-Layer ANN layout showing the interconnection relationship between chips.

2 showing the relationship of a SynChip 12 and its neighbor NeuChip 14 on the first layer 1 of the network of FIG. 1. For a better visualizations of the interconnections between multiples of SynChips 12 and NeuChips 14, a complete network for one layer having 96 direct analog inputs and 64 direct analog outputs is illustrated in FIG. 9. Note the top three NeuChips 14 also serve as a layer 0 as seen in FIG. 1.

The digital host bus (DataAdd) 16 runs between the Synaptic and Neural chips 12,14 to pass the necessary signals to all NeuChips 14 and Synaptic Chips 12 located in the same row. The bus (DataAdd) 16 lines are the only exception to the localization of the system's interchip connectivity. It should also be noted that the orientation of the SynChip 12 shown in FIG. 2 provides pins along the upper edge for mating directly to the lower edge of another SynChip 12 and/or to the right side of a NeuChip 14. Likewise, the right side of a SynChip 12 mates directly to the left side of another SynChip 12 or to the left side of a NeuChip 14.

Figure 3:
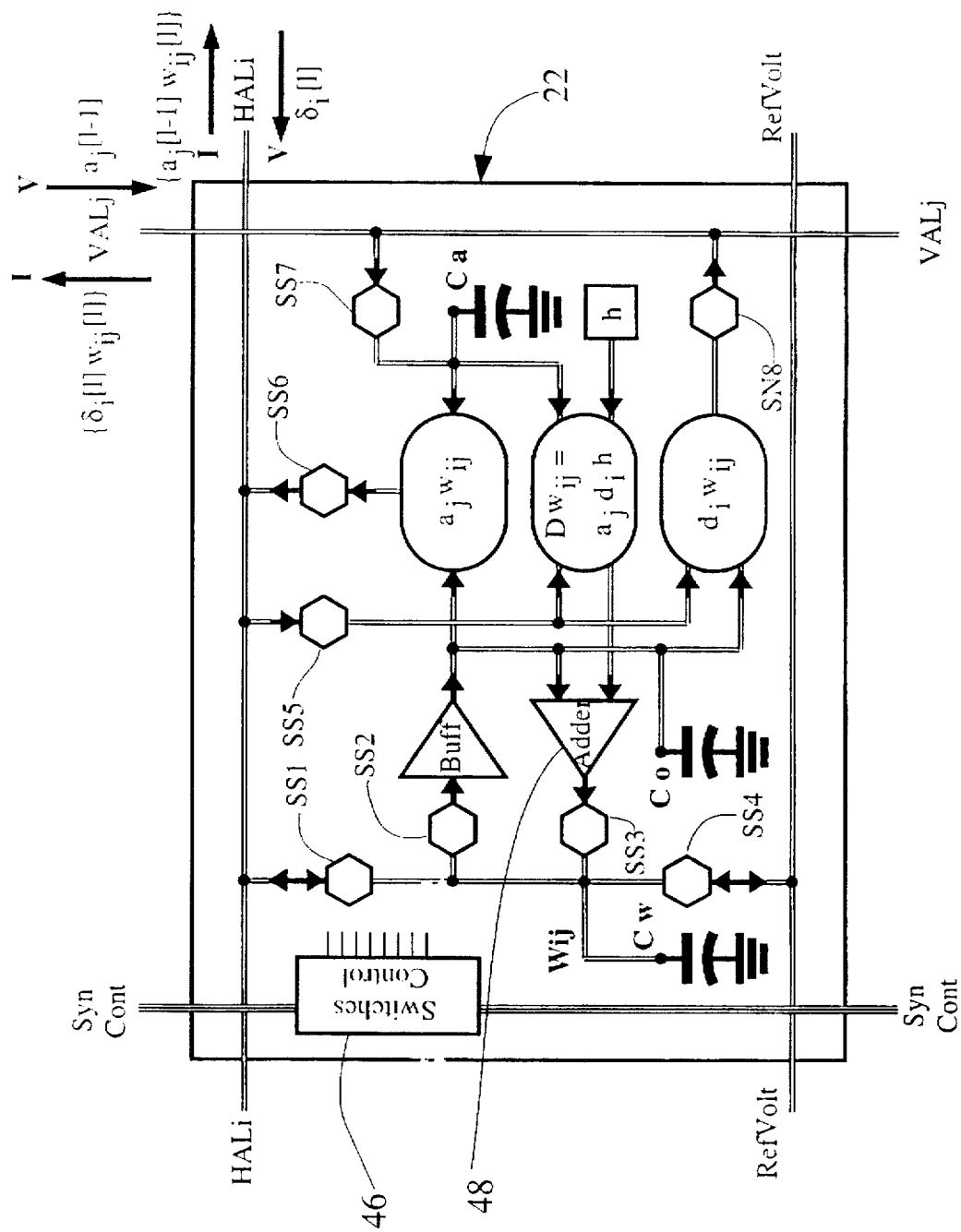
FIG. 3 is the SynMod showing functional block and SS switches.
Figure 4:
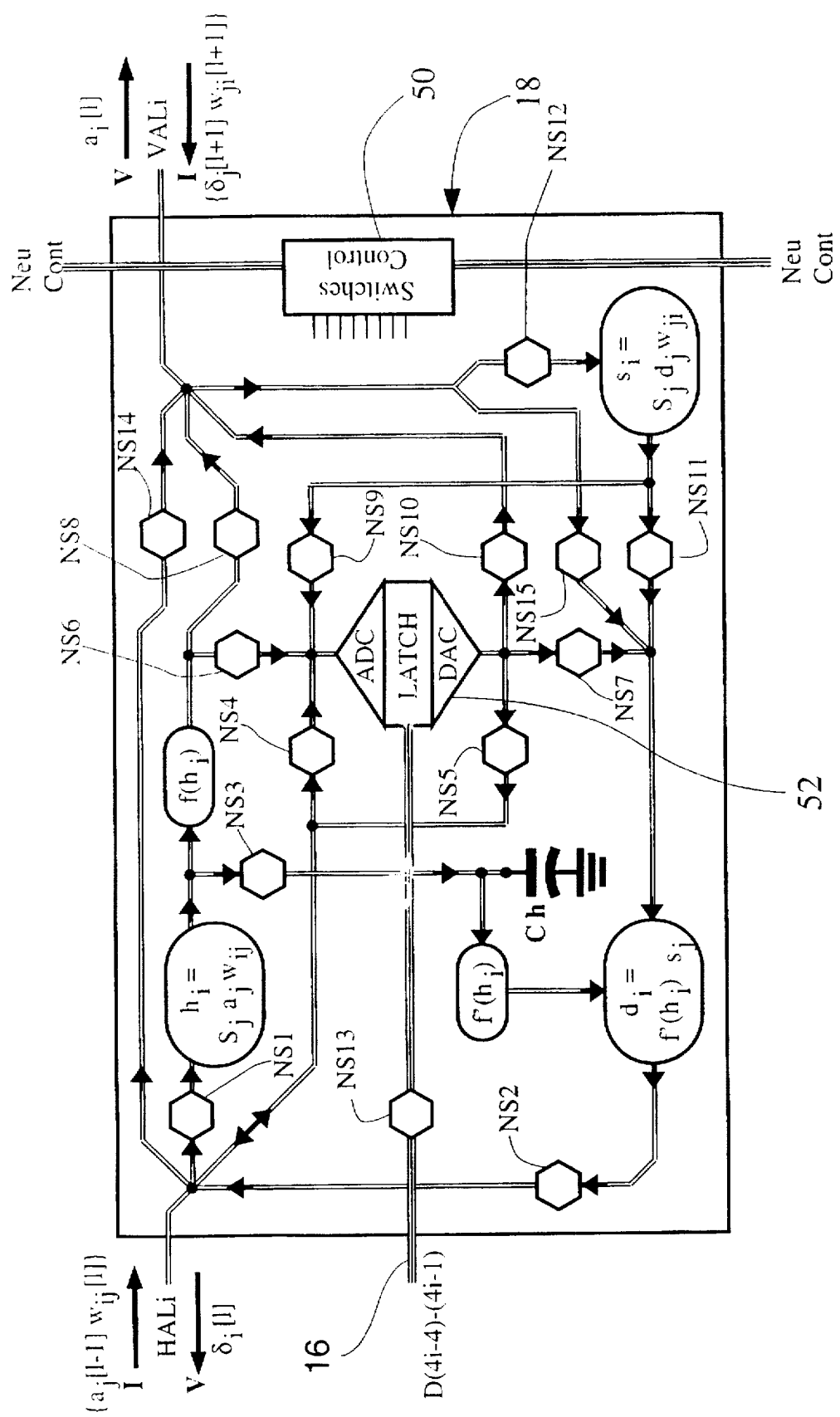
FIG. 4 is the NeuMod showing functional block and NS switches.
Figure 5:
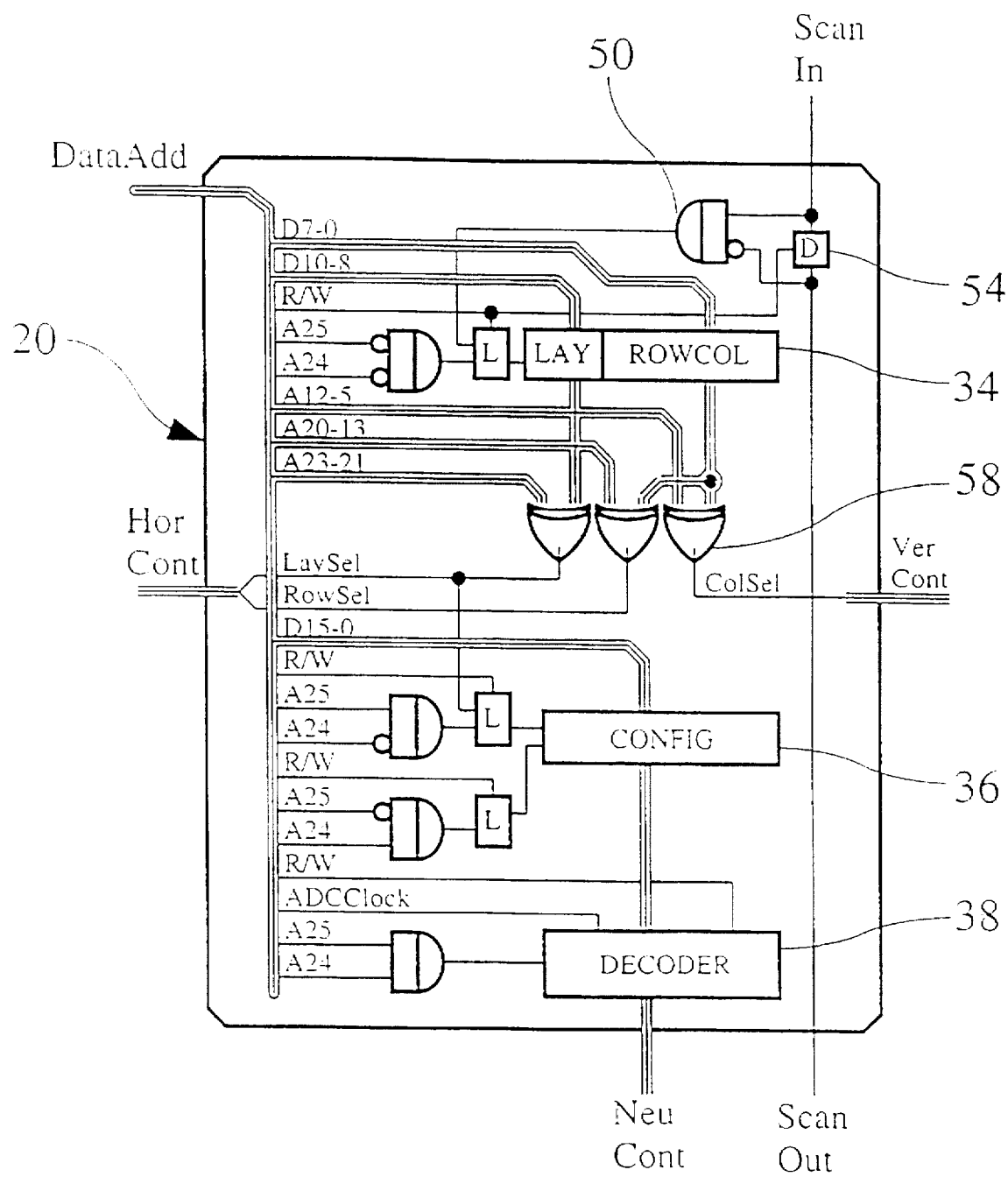
FIG. 5 is the NeuLogic digital control block diagram of the NeuChip.

The NeuChip shown in FIG. 2 consists of 32 analog neuron modules (NeuMod) 18 and a digital control block (NeuLogic) 20, which are block diagrammed in FIGS. 4 & 5, respectively. The SynChip 12 consists of an array of 32×32 analog synapse modules (SynMod) 22, a digital control block (SynLogic) 24, a voltage reference (Refvolt) 26 having 16 levels, and 32 refreshing blocks (RefMod) 28 which are block diagrammed in FIGS. 3,6,& 7 respectively. The circuities of Digital control block (SynLogic) 24 and Neural Logic (NeuLogic) 20 (white blocks in FIG. 2) are pure digital, whereas, all other blocks are mostly analog. This mixture of technologies allows the integration of the smaller size analog functional units with the convenient control and interface of conventional digital host computers. The following is a detailed description of the Synaptic and Neural Chips 12,14 and their constituent building blocks. The Synaptic Chip (SynChip) 12 receives some digital signals (shown as solid lines in the diagrams), such as address and data signals, through the right side of the chip from the host bus (DataAdd) 16. These signals are used by the Digital Control block (SynLogic) 24 and passed to the adjacent Synaptic Chip (SynChip) 12 through the left side of the chip. Also looking at FIG. 2 the SynChip 12 receives horizontal control lines (HorCont) from the NeuChip 14 of the same layer and vertical control lines (VerCont) from the NeuChip 14 of the previous layer. Please note that the horizonal control (HorCont) and vertical control (VerCont) lines respectively propagate horizontally and vertically throughout the entire matrix of SynChips 12 within the same layer. Signals received from DataAdd bus 16, HorCont, and VerCont lines to the Digital Control block (SynLogic) 24 of every SynChip 12 generates and maintains all necessary local and global control and configuration signals. The outputs of the Digital control block (SynLogic) 24 shown in FIG. 2 include the Reference control (RefCont) bus and a set of 32 Synapse control (SynCont) buses. The Reference control (RefCont) signals connect to all 32 vertical RefMod 28 to provide the proper refreshing control. Each RefMod 28 is responsible for refreshing the synapses of the 32 SynMods 22 to its left. Each Synaptic control (SynCont) bus connects to the 32 SynMods 22 in the same column.

The SynChip 12 has two sets of analog lines (dotted lines in FIG. 2: 32 horizontal analog lines (HAL1, HALi, & HAL32) and 32 vertical analog lines (VAL1, VALj, & VAL32). The Horizonal analog lines HAL are all physical analog wires which run horizontally across each SynChip 12 from left to right and from one SynChip 12 to another until they mate directly to the left side of the NeuChip 14 within the same layer. The Vertical analog lines VAL do the same except that they run vertically to mate directly to the right side of a NeuChip 14 of the previous layer. Both horizonal and vertical analog lines HAL, VAL are bi-directional which either collect current signals from SynMod 22 and inject them into the NeuMods 18, or take voltage signals form NeuMods 18 and distribute them to SynMods 22. The direction and kind of analog signals produced depend on the mode of operation as will be discussed later. The NeuChip 14 comprises the Neural Logic (Neulogic) 20 and the 32 NeuMod blocks 18 as depicted in FIG. 2. The NeuLogic 20 which encapsulates all digital control circuities receives signals from the host bus (DataAdd) 16 as well as a special signal (ScanIn) 30 from the NeuChip 14 of the previous layer. NeuLogic blocks 20 are responsible for the generation of all addressing signals; They generate the horizontal control (HorCont) busses from the left side to control all the rows within the same layer, and the vertical control (VerCont) busses from the right side to control all the columns of the next layer. It should be noted that only one Neural Chip 14 controls one complete row of Synaptic Chips 12 within the same layer and one complete column of Synaptic Chips 12 of the next layer. In addition to Horizontal Control (HorCont) and Vertical Control (VerCont) addressing signals, the NeuLogic block 20 generates a special signal (ScanOut) 32 which also connects to the ScanIn 30 line of the succeeding NeuChip 14. This ScanIn/ScanOut 30,32 sequence from one NeuChip 14 to another within the same layer and from one layer to another is a novel technique for sequential initialization of all the layers in the system (see the hair line connecting all NeuChips 14 in the 2-layer system of FIG. 1. As will be detailed later, this technique eliminates the need for off-chip global addressing hardware, is what we call embedded addressing.

The NeuMod blocks 18 generate/collect the Horizontal Analog Line HAL signals from the left side and the Vertical Analog Line VAL signals from the right side to mate with the SynChips 12 as explained earlier. However, these Horizontal and Vertical Analog Lines HAL, VAL do not pass through the NeuMods 18 as they do in the SynMods 22, instead, they are either initiated or terminated. For an insight on this difference between the HAL and VAL lines, see the detailed block diagrams of the NeuMod 18 and SynMod 22 in FIGS. 4 & 3 respectively.

The following sections will describe in detail the inner structure and the functionality of each building block of Synapse and Neural Chips 12,14.

6.3. NeuLogic, Neuron Control Block

The NeuLogic 20 shown in FIG. 5 for a NeuChip 14 encapsulates the digital control for system initialization and configuration. System Initialization is a sequence of host operations which, for each NeuChip 14, downloads a unique identification label to a dedicated register called Layer and RowColumn (LAY-ROWCOL) 34. The 3-bit Layer LAY portion of this register identifies the number of the layer to which this NeuChip 14 belongs. Therefore, the system may handle as many as 8 layers. Of course the layer LAY portion of the register 34 can be made with 4 bits to support 16 layers but we do not envision any need for more than 8 layers. The 8-bit Row Column (ROWCOL) portion of the identification register 34 holds one number that serves two purposes. First, it identifies within the same layer, the row number of the Synaptic Chip's matrix to which this particular Neural Chip is associated. Second, it identifies the column number within the next layer. This is possible due to the fact that the number of rows in layer 1 equates the number of columns in layer l+1. These two numbers, LAY and ROWCOL, once loaded in the initialization sequence, remain unchanged throughout the entire system operation until the system is reset. During all modes of operation, they are used for chip address decoding as will be explained later.

Once all the Layer LAY, Row Column ROWCOL registers 34 have been initialized, every Synaptic Chip of the system becomes uniquely addressable. Note that the maximum system configuration is 8 layers and 256×256 Synaptic Chips per layer (64 Meg synapses per layer). The host may access any Synaptic Chip by placing the layer, row, and column numbers on address lines A23-21, A20-13, and A12-5, respectively as shown in FIG. 5. Then the Neural Logic (Neulogic) 20 portion of each Neural Chip 14 generates three select signals. Layer select LaySel, row select RowSel, and column select ColSel as shown in FIG. 5. A Synaptic Chip 12 is identified when the three signals are all high, and a Neural Chip 14 is identified when signals at LaySel and RowSel are high. The least significant 5-bits of the host address, A4-0, are used to identify a column of Synapse modules 22 within the Synaptic Chip 12. This would enable the host to load/unload data to/from 32 synapses at a time (32 bus cycle). A Synaptic Chip 12 requires one bus cycle to complete the weight load/unload process for all 32×32 synapses.

The CONFIGURE (CONFIG) register 36 is used to hold the system configuration information such as setting the NeuChips 14 of any layer to act as input, intermediate, or output stage, or to accept/produce analog or digital direct inputs/outputs. Moreover, the CONFIG register 36 holds the information which identifies the mode of operation such as Recall, Learn, Load, Unload and others. When lines A25, A24=10 (binary) seen in the Neulogic diagram of FIG. 5, it allows the host to write to the CONFIG register 36 of all Neural Chips 14 of one layer identified by A23-21, but when lines A25,A24=11, it writes to all CONFIG registers 36 of all NeuChips 14 of the system. All configuration information is decoded by the Decoder register 38 to generate the neuron control bus Neucont, which is passed to all of the 32 Neural Modules 18 of each Neural Chips 14, as seen in FIG. 2. These signals control the switches inside the Neural Modules 18. Details on the different modes and the switch controls will be furnished in later sections.

6.4. SynLogic, Synapse Control Block

Figure 6:
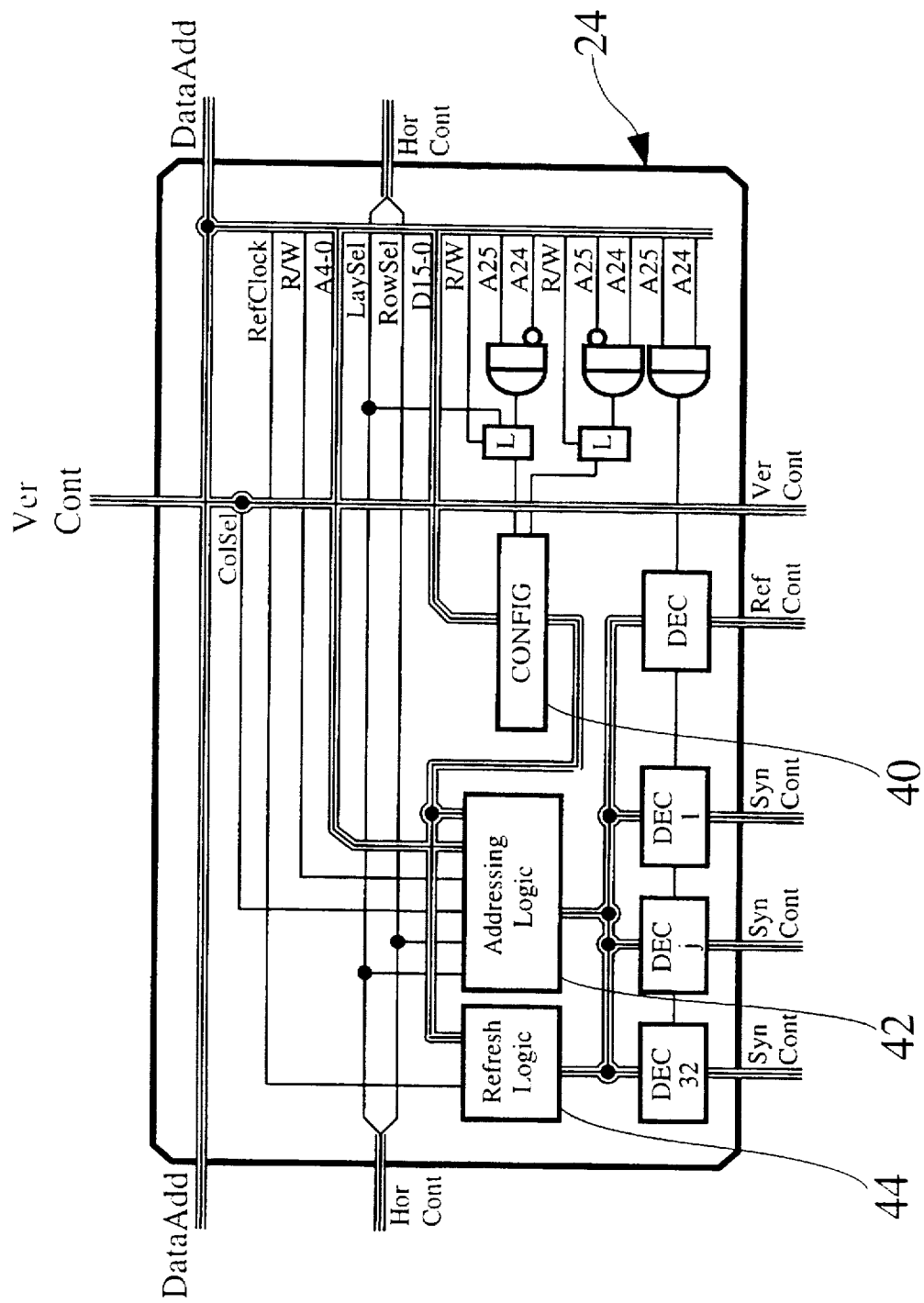
FIG. 6 is the SynLogic digital control block diagram of the SynChip.

The Configuration (CONFIG) register 40 of the Synapse Logic (SynLogic) 24 as seen in FIG. 6 for the SynChip 12 is just a copy of that of the Neural Logic and is loaded in the same fashion. The Addressing Logic block 42 takes the three selection lines layer select LaySel,row select RowSel, and column select ColSel, the low address lines (A4–0), and the configuration (CONFIG) bits register 40 to generate the necessary control signals inside the Synapse Chip 12. The Refreshing Logic block 44 generates the sequential refreshing control signals fed to the decoding blocks DEC. The Refreshing control (RefCont) bus signals generated by decoder DEC, identically controls the switches in all 32 Refreshing modules (RefMods) 28 as illustrated in FIG. 2. Similarly each Synapse control (SynCont) bus generated by the decoder DEC-j, identically controls the switches in all 32 SynMods 22 of column j. The arbitration of all Refreshing and Synapse Control signals will be discussed in details in later sections.

6.5. SynMod, Synapse Module

The synapse module 22 is electrically illustrated in FIG. 3. The solid hexagons labeled synapse switches SS1-8 are all passive analog switches each of which is controlled by a dedicated digital control signal (not shown in the figure for clarity) from the Switches Control block 46. These digital control signals are level-sensitive whereas high=on and low=off.

Figure 10:
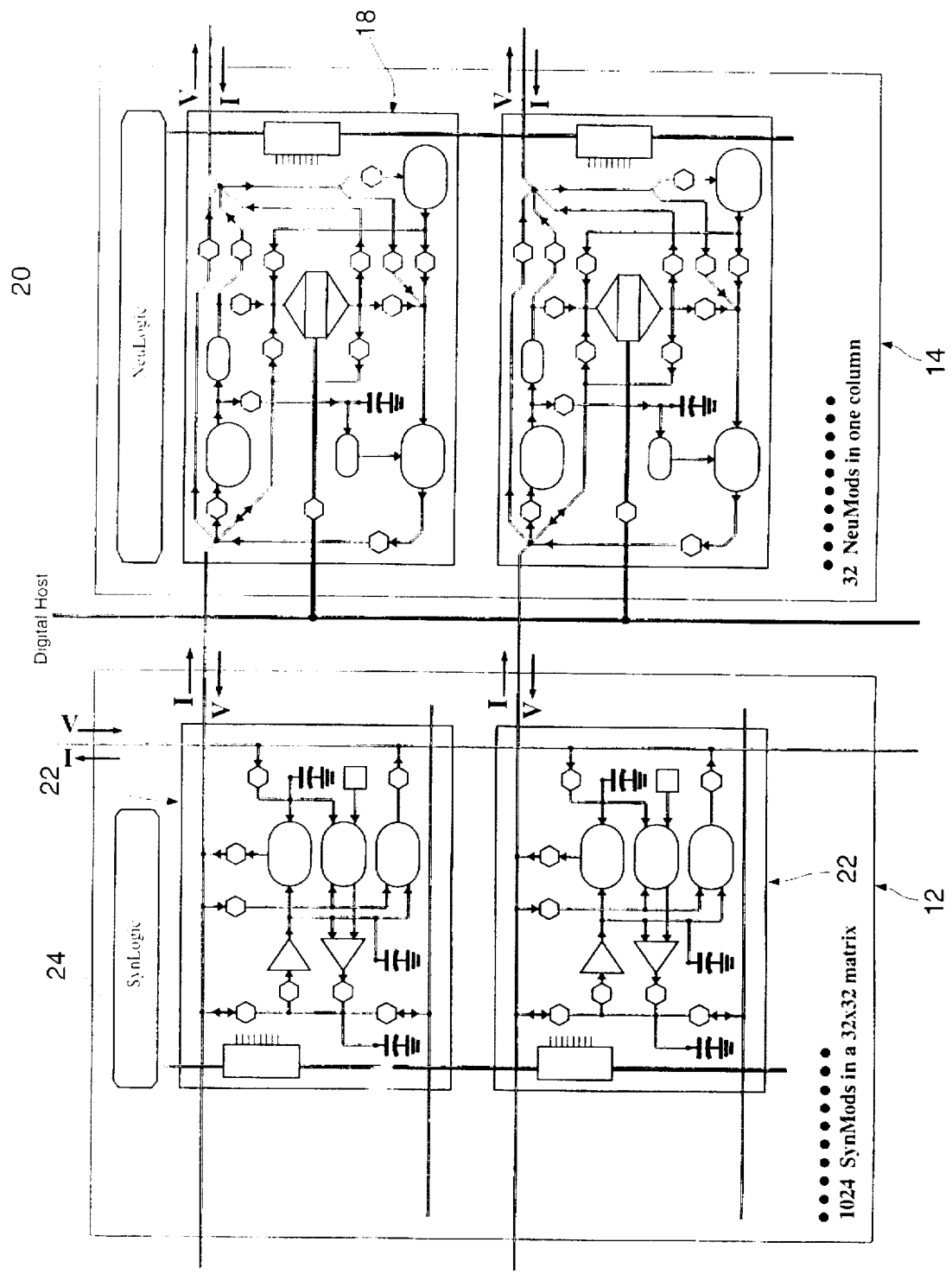
FIG. 10 is the interconnection relationship of 1024 Synmods in a 32×32 matrix and a 32 NeuMods in a NeuChip at the Module Level.

The Vertical analog line VALj seen in FIG. 3 carries the activation value $a_j|\iota-1|$ as a voltage level from the previous layer and passes it vertically to all SynMods 22 via in all SynChips 12 within the same layer, see FIG. 10. This activation value and the weight value $w_{ij}$, stored in the weight capacitor Cw, are presented by synapse switches SS7 and SS2 to the voltage multiplier $a_j w_{ij}$ seen in (FIG. 3). The multiplier $a_j w_{ij}$ acts as a current source and its whose value is proportional to the input voltage levels is passed to the HALi line via switch SS6. The HALi line horizontally collects all current contributions $\{a_j|\iota-1|w_{ij}|\iota|\}$ from all SynMods 22 labeled $_{i32-i1}$ of all SynChips 12 illustrated in (FIG. 2) within the same layer and present the accumulated current to the corresponding NeuMod 18 which is a current-summing operational amplifier $h_i=\Sigma_j a_j w_{ij}$ seen in (FIG. 4). Thus, in the recall mode of operation, SS2, SS6, and SS7 are "on" and the data flows into the SynChips 12 as voltages via the vertical analog lines VAL and flows out as currents via the Horizontal analog lines HAL.

In the learning mode, SS5 and SS8 switches are "on" instead of SS6 and SS7 so as to allow data to flow backward; Error signals $\delta|\iota|$ seen in FIG. 3, coming from the Neural Chips of the same layer, flow into the SynChips 12 as voltages via the horizontal analog lines HAL, get manipulated, and flow out as currents $\{\delta_i|\iota|w_{ij}|\iota|\}$ via the vertical analog lines VAL. These currents which are the product outputs of the individual voltage multipliers $\delta_i w_{ij}$ accumulate vertically on the vertical analog lines VAL and finally get added up in the NeuChips 14 of the previous layer. (See the current input at the right side of the NeuMod 18 in FIG. 4 A third voltage multiplier in the Synapse module 22 calculates the weight update value $\Delta\omega_{ij}=a_j\delta_i\eta$ which is the product of the activation value of previous layer, error value, and learning factor. This product output is added by the Adder Block 48 to the old value of the weight stored in the old weight capacitor Co. The new weight value is finally placed on the weight capacitor Cw via switch SS3. The triangular block labeled Buff is a voltage buffer which helps the weight capacitor Cw retains its voltage level against charge sharing with other functional units. The $\eta$ block 50 represents the learning factor which is a constant generated at the SynChip level and distributed to all Synapse Modules in the Synapse Chip. A capacitor Ca is also utilized to temporarily store the last activation value when the mode of operation is switched to Learning.

Switch SS4 and the RefVolt horizontal line are utilized by the refreshing mechanism to refresh the synaptic weights as will be explored later. Finally, SS1 is provided to load/unload the weight value to/from the weight capacitor Cw through the Horizontal analog lines.

6.6 NeuMod, Neuron Module

The neuron module 18, is illustrated in FIG. 4. Note that in contrast to the Synapse Module 22, the Horizontal and Vertical analog lines HAL,VAL of the Neuron Module do not pass throughout the module from side to side; These lines carry two different signals. The summation block labeled $h_i=\Sigma_j a_j\omega_{ij}$ is a current-summing OpAmp which adds up all currents $\{a_j|\iota-1|w_{ij}|\iota|\}$ accumulated on the HALi line (see FIG. 10) The sum is adjusted by the nonlinear function block $f(h_i)$ to compute the activation value $a_i|\iota|$ for the next layer. This activation value is presented as a voltage level on the vertical analog line VALi via switch NS8 seen in (FIG. 4). Therefore, in the recall mode, only switches NS1 and NS8 are turned "on". However, if there is a desire to monitor the activation values of any layer $|\iota|$ by the host, switch NS6 may be turned "on" and the analog value $a_i|\iota|$ is digitized by the ADC portion of the latch block 52 and its 4-bit representation is read off the 4-bit data lines D(4$i$-4)–(4$i$-1). Note that the data bus 16 of the host is 128-bit wide allowing the host to read all of the 32, 4-bit activation values from the 32 NeuMods 18 in one NeuChip 14 in one bus cycle. (See the data lines at the left side of the NeuChip 14 of FIG. 2. Moreover, in some cases, it might be desired to obtain the activation value $a_i|\iota|$ through Neuron switches NS6, ADC, DAC, and NS10 instead of directly via NS8. In the learning operation the data flow is reversed as the error signals are propagated in reverse. At every vertical analog line VALi, a set of currents $\{\delta_j|\iota+1|w_{ij}|\iota+1|\}$ accumulate and pass to the summation block $\sigma = \Sigma_j \delta_j w_{ij}$ via NS12. The sum, then, passes NS11 to the multiplier $\sigma_i = f'(h_i)\sigma_j$ to generate the error $\sigma_i|\iota|$ which is outputted at HALi via NS2. Note that the multiplier $\sigma_i = f'(h_i)\sigma_j$ obtains the value $f'(h_i)$ from the $f'(h_i)$ block whose input value $h_k$ previously stored in the capacitor Ch during the recall phase. Switch NS3 turns "off" in the learning phase to retain the Ch capacitor's voltage level.

Loading/unloading the synaptic weights to/from the capacitors from/to the host via bus 16 is done via the horizontal analog line HAL and switches NS4 and NS5. The ADC and DAC portions of the latch block 52 are connected back to back through the 4-bit register, with LATCH 52 connected to the host data bus (DataAdd) 16. Switches NS4, NS7 and NS9 are provided to monitor and control the values of the error signals.

6.7 RefMod, Refreshing Module

Figure 7:
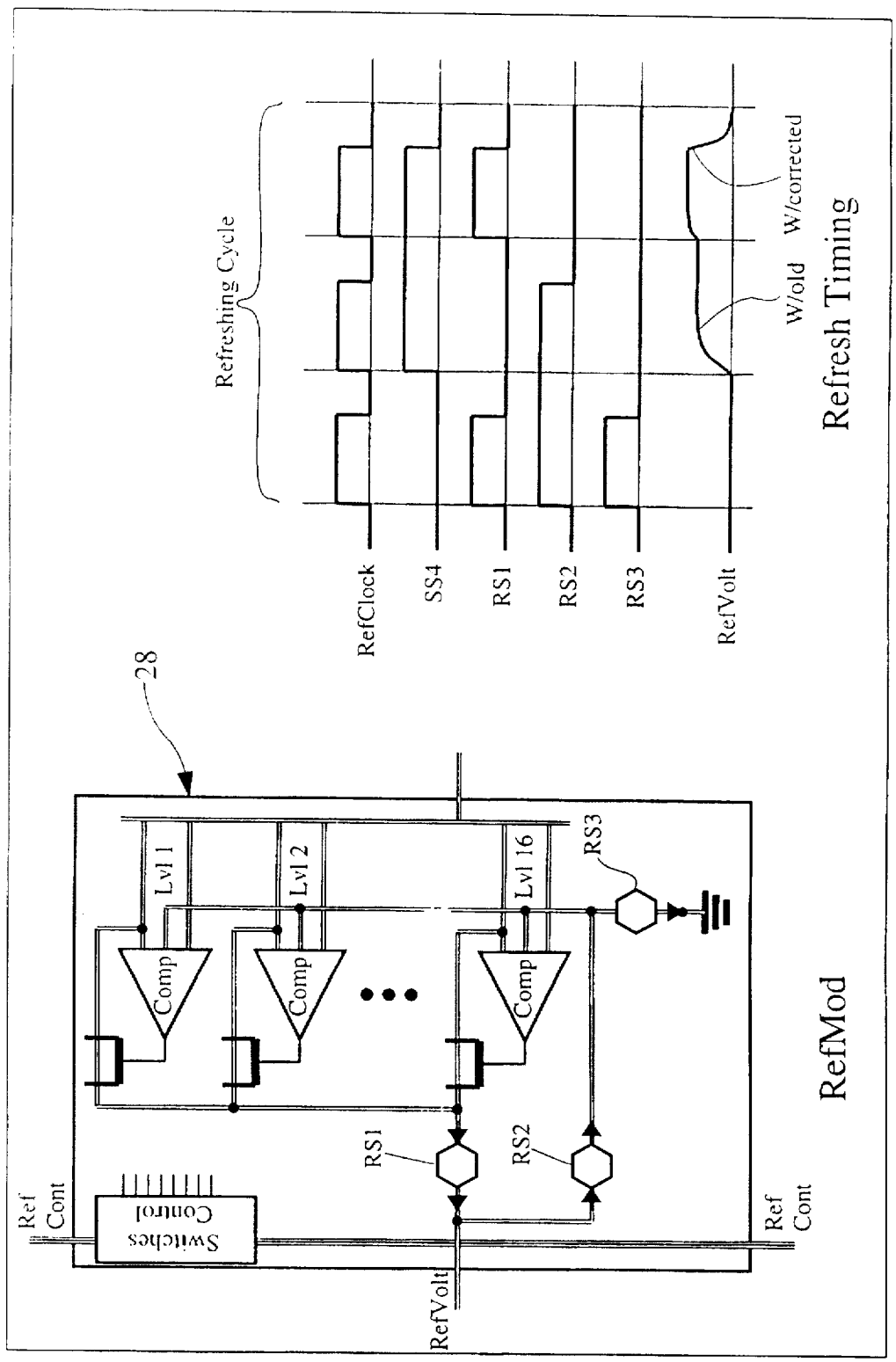
FIG. 7 is the refmod, weight refreshing block diagram and its timing for one Refresh Cycle.

The refreshing module, illustrated in FIG. 7, is mainly composed of 16 comparators. Each comparator, labeled Comp, receives from the 16-Level Volt Reference Refvolt (FIG. 2), a pair of reference voltages which define the upper and lower boundaries of the corresponding level. These 16 levels of reference voltages represent the 16 different possible values of the 4-bit weight being received. If the weight voltage value is in between the boundaries of one level, it is presumed that the weight value has degraded from its normal level which is the upper boundary of that level. Therefore, the weight value is boosted (corrected) up to the upper boundary of the level. This correction is accomplished by the pass transistors RS1-3 which brings the upper boundary value back to the weight capacitor Cw.

The RefVolt line is bidirectional: First, it senses the voltage level of the weight capacitor Cw via synapse switch SS4 seen in FIG. 3 which is passed to the central taps of all Comps via the refreshing switch RS2. Then, the corrected value is passed back to the capacitor via RS1. Switch RS3 is used for internal charge flushing. The refreshing procedure is explained in details in a later section.

6. 8. Operational Modes and Neural Operations

The host utilizes the most significant two bits of the address bus to instruct all the NeuChips and SynChips 12,14 to react, corresponding to different modes of operation. For example, when A25,A24=00; the chips are set for the initialization procedure. There are three basic modes: Initialization, Configuration, and Neural Operations as depicted in Table.2. In the following sections, these modes will be discussed and all necessary flow charts, block diagrams, and algorithms are furnished.

6. 9 Initialization Procedure

The initialization procedure is invoked only once every time the system is turned "on" or reset. The sole purpose of this procedure is to assign to all the SynChips and NeuChips 12,14 sequential layer numbers as well as row and column numbers within each layer. These numbers will be thereafter used by the host, via the dataAdd bus 16, as addresses to communicate with a certain layers and/or certain chips. This technique is referred to as "embedded addressing" effectively eliminates the need for all external hardware support.

TABLE 2

System Address Space and the Various Modes of Operation.

| Address Lines | | | | | Data Lines | | Mode | No of Cycles | Actions |
|---|---|---|---|---|---|---|---|---|---|
| 25–24 | 23–21 | 20–13 | 12–5 | 4–0 | 127–16 | 15–0 | | | |
| 00 | x | x | x | x | x | label | Global Initialization | $\Sigma_0^L N_i$ | Sequential load, One NeuChip at a time: LAY-ROWCOL ← label |
| 01 | x | x | x | x | x | config | Local Configuration | 1 | Paralle Load, All NeuChips at same time: CONFIG ← config |
| 10 | layer | x | x | x | x | config | Configuration | 1 per layer | Sequential load, One layer at a time: CONFIG ← config |
| 11 | layer | row | column | synapse | 32 4-bit data | | Neural Operations | N/A | Neural operations: based on CONFIG register and switches settings. |

Notes: In the first 7 columns, x means don't care and all other words are binary values.

TABLE 3

System Neural Operations and their Corresponding Switches Settings.

| SynMod Switches SSx | | | | | | | | NeuMod Switches NSx | | | | | | | | | | | | | | | Neural Operations |
|---|---|---|---|---|---|---|---|---|---|---|---|---|---|---|---|---|---|---|---|---|---|---|---|
| 1 | 2 | 3 | 4 | 5 | 6 | 7 | 8 | 1 | 2 | 3 | 4 | 5 | 6 | 7 | 8 | 9 | 10 | 11 | 12 | 13 | 14 | 15 | |
| A | 0 | 0 | 0 | 0 | 0 | 0 | 0 | 0 | 0 | 0 | 0 | 1 | 0 | 0 | 0 | 0 | 0 | 0 | 0 | B | 0 | 0 | Load. Weight |
| A | 0 | 0 | 0 | 0 | 0 | 0 | 0 | 0 | 0 | 0 | 1 | 0 | 0 | 0 | 0 | 0 | 0 | 0 | 0 | B | 0 | 0 | Unload. Weight |
| 0 | 1 | 0 | C | 0 | 1 | 1 | 0 | 1 | 0 | 1 | 0 | 0 | 0 | 0 | 1 | 0 | 0 | 0 | 0 | 0 | 0 | 0 | Recall. Ang |
| 0 | 1 | 0 | C | 0 | 1 | 1 | 0 | 1 | 0 | 1 | 0 | 0 | 1 | 0 | 1 | 0 | 0 | 0 | 0 | B | 0 | 0 | Recall. Ang. Mon |
| 0 | 1 | 0 | C | 0 | 1 | 1 | 0 | 1 | 0 | 1 | 0 | 0 | 1 | 0 | 0 | 1 | 0 | 0 | 0 | 0 | 0 | 0 | Recall. Dig |
| 0 | 1 | 0 | C | 0 | 1 | 1 | 0 | 1 | 0 | 1 | 0 | 0 | 1 | 0 | 0 | 1 | 0 | 0 | 0 | B | 0 | 0 | Recall. Dig. Mon |
| 0 | 0 | 1 | 0 | 1 | 0 | 0 | 1 | 0 | 1 | 0 | 0 | 0 | 0 | 0 | 0 | 0 | 1 | 1 | 0 | 0 | 0 | 0 | Learn. Ang |
| 0 | 0 | 1 | 0 | 1 | 0 | 0 | 1 | 0 | 1 | 0 | 0 | 0 | 0 | 0 | 1 | 0 | 1 | 1 | 0 | B | 0 | 0 | Learn. Ang. Mon |
| 0 | 0 | 1 | 0 | 1 | 0 | 0 | 1 | 0 | 1 | 0 | 0 | 0 | 0 | 1 | 0 | 1 | 0 | 0 | 1 | 0 | 0 | 0 | Learn. Dig |
| 0 | 0 | 1 | 0 | 1 | 0 | 0 | 1 | 0 | 1 | 0 | 0 | 0 | 0 | 1 | 0 | 1 | 0 | 0 | 1 | B | 0 | 0 | Learn. Dig. Mon |
| 0 | 0 | 0 | 0 | 0 | 0 | 0 | 0 | 0 | 0 | 0 | 0 | 0 | 0 | 0 | 0 | 0 | 0 | 0 | 0 | 0 | 0 | 0 | Standby |

Notes:

A = LaySel * RowSel * ColSel * A4–0

B = LaySel * RowSel

C is an autonomous signal which is independent of all selection and address signals. It is generated locally in each SynChip such that SS4s of all SynMods in one column of the SynChip are turned on simultaneously for refreshing. Also, it cycles through the 32 columns so that one column is enabled (refreshed) at a time. The switch settings in the table are for general layers; the input and output layer settings may be different as indicated in the algorithm of each neural operation.

How the host could initially address all the NeuChips without any external address decoders is the key role of the two special signals, ScanIn and ScanOut 30,32 of each NeuChip. These special signals are chained top-down within the same layer and bottom-to-top from one layer to another. The very first NeuChip 14 of the system (top one in layer 0) has its ScanIn 30 input always tied high and the very last NeuChip 14 (bottom one in last layer) has its ScanOut 32 disconnected.

After system reset, the input of the "D" flip-flop 54 shown in FIG. 5 of the first NeuChip 14 is high and its output is yet low. Consequently, the output of the connecting "AND" gate 56 is high. If A25,A24 address lines=00, in itialization mode, then both enabling inputs (left side) of the "L" circuit are high. This is the condition for the "L" circuit to pass the R/W line write-transition to the LAY-ROWCOL register 34 which latches the addressing information from the D10–D8 data lines. Meanwhile, with the same R/W line transition, the "D" flip flop 54 transfers the high value to its output ScanOut 30 changing the "AND" gate 56 output to low. This disabling of the "L" circuit will make the LAY-ROWCOL register 34 retain its contents till another reset occurs. All these action are still within the first bus cycle of the system. During the second bus cycle, all these actions and signal assertion take place again in the same order in the second NeuChip 14, then, the third NeuChip and so on. This domino action continues initializing the LAY-ROWCOL registers 34 once every bus cycle till all NeuChips 14 have been traversed and the ScanOut 32 of the last NeuChip goes high. The host automatically generates the data to be latched for every bus cycle according to Algorithm 1 shown below. As an example, consider the network of FIG. 1 where the system dimensions are: L, $N_0, N_1, N_2 = 2,3,2,2$.

The initialization algorithm would generate the following seven LAY-ROWCOL binary values:

000-00000001, 000-000000010, 000-00000011

001-00000001, 001-000000010

010-00000001, 010-000000010.

Figure 8:
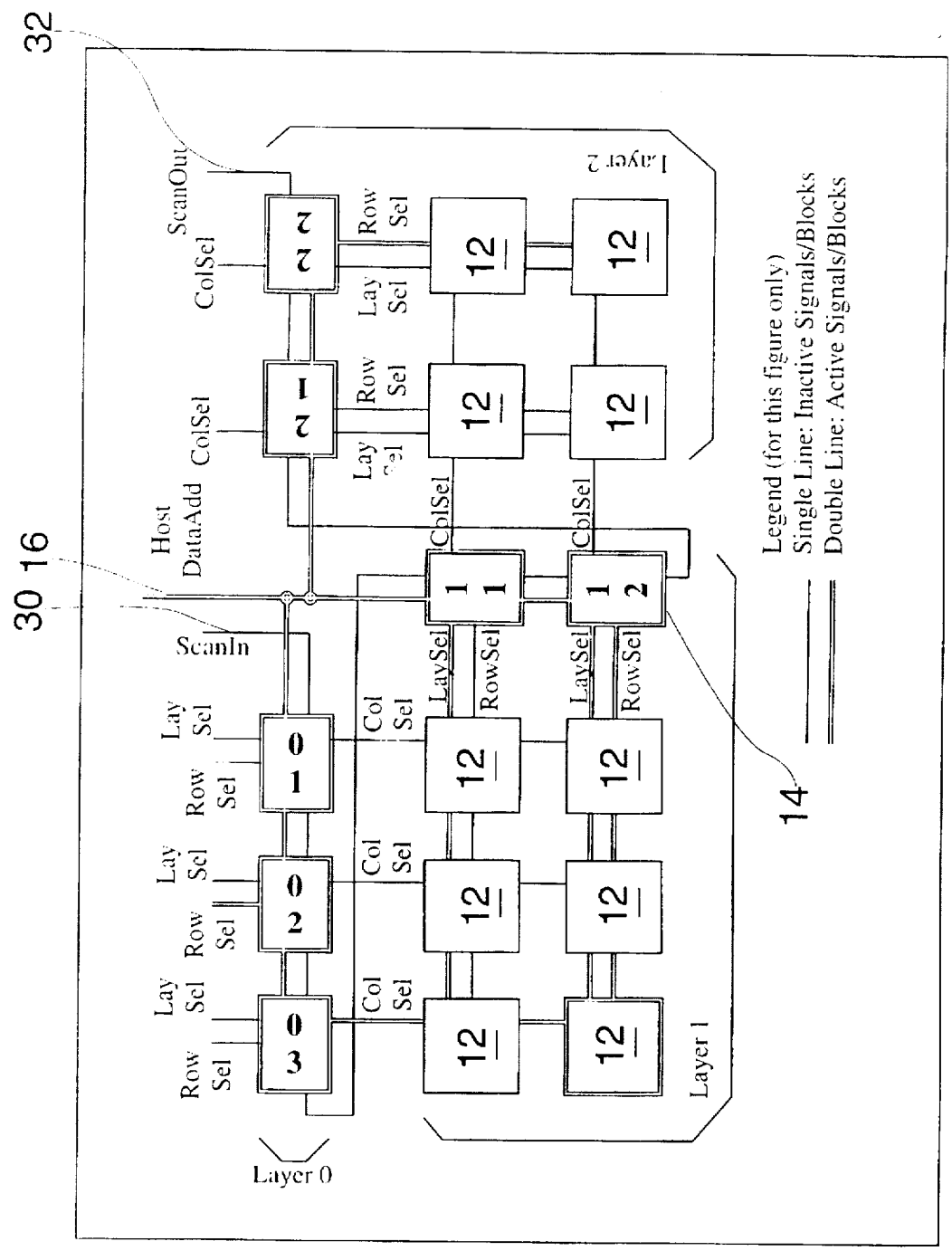
FIG. 8 is a Chip Addressing technique showing an example for Active Select Lines.

These numbers are stored in the corresponding LAY-ROWCOL registers in the order they are generated as illustrated in FIG. 8. Note that for the clarity of this figure, the LAY-ROWCOL numbers are represented in decimal and all signal lines are omitted except the host bus "DataAdd" 16 the select lines LaySel, RowSel, and ColSel, and the ScanIn and ScanOut lines.

A select line (see the outputs of the XOR gates 58 in the NeuLogic block 20 of FIG. 5) is activated when there is a match between the asserted address lines and the address label in the LAY-ROWCOL register 34. Note again that the ROWCOL part is compared to A20–A13 to activate the RowSel lines within the same layer and to A12–A5 to activate the ColSel lines for the next layer. All three select lines must be active to select one SynChip 12 and all address decoding in done in the Addressing Logic block 42 in FIG. 6.

Algorithm 1:

Initialize Procedure

1. Reset the entire "ANN" system; All registers cleared.
2. Read the system dimensions: L, $N_0, N_i, \ldots N_L$, where $N_i$, is the number of NeuChips in layer "i" and "L" is the number of layers.
3. Set A25A24=00; Initialization Mode
4. Execute the loop:

```
for (i=0;i=L, i++)
    { for (i=1; j=N₁; i++)
        { Assert D10–8 = i;
          Assert D7–0 = i;
          Assert R/W low Signal pulse (write cycle)
              {LAY-ROWCOL ←D10-0; Trigger the "D" flip flop;}
    } }
```

6.10. System Configuration Procedure

Once the system is initialized, the configuration procedure is executed as to configure all the chips in the system to comply with one given mode. The first configuration procedure, however, permanently sets some special bits of the CONFIG registers 40 in the SynChip Logic block 24 so as to configure top layer 0 as the input layer, layer "t" as the output layer, and all others as hidden layers. Thereafter, all neural operations may proceed. Other subsequent executions of the configuration procedure may be invoked to alter the configuration bits as to facilitate different neural operations.

All configuration information is stored in the CONFIG registers 36,40 as demonstrated in Algorithm 2 below.

The system can be configured to perform ten different neural operations all of which are tabulated in Table 3. Decoding of the CONFIG bits is done in two steps: First through the DECODER 38 in the NeuLogic block 20 of the NeuChip 14 which generates NeuCont control lines as seen in FIG. 5 which pass to all NeuMods 18 within one of the NeuChips seen in FIG. 2. Second within each NeuMod 18, the NeuCont lines are further decoded by the switch control block 50 seen in FIG. 4 to generate the final control signals for all switches and other functional blocks. The same thing applies to the decoding within the SynChips 12, except that the SynLogic 24 generates 32 groups of synapse control SynCont lines and one group of refreshing control RefCont lines shown in FIG. 2. The final settings of all switches for all possible neural operations which are depicted in Table 3 determine the state of the ANN system. Note that the switch settings for the NeuMods 18 are different in layers 0 & 1.

6.11 Synaptic Weight Loading and Unloading Operations

If the system has been previously trained and all synaptic weights are known, they may by downloaded from a host to the Synapse Chips 12 and stored in the analog capacitors Ca. The downloading operation is outlined in Algorithm 3. Note that the subscript of the weights (e.g. $W_{(32r-31)(32c+B-1)}[l]$) represent the weight index in the weigh matrix of layer $|l|$ as a whole. For example, $W_{278,517}[2]$ will be downloaded to the weight capacitor Cw of $SynMod_{ij}=SynMod_{22,5}$ (FIG. 2) of the SynChip 12 in row r=9 and column c=17 of layer 2.

It should be noted that each iteration of the most-inner loop corresponds to one bus cycle through which 32 weights (one whole column of weights in a SynChip) are loaded in parallel via the 128 data lines. For example, to load the weights of column 17 in the SynChip 14 of row two and column three of layer 2, a host must generate the following address:

A25,A24=11b

A23–A21=layer=1d

A20–A13=row=2d

A12–A5=column=3d

A4–A0=synapses=17d

Algorithm 2:
Configure (Operation) Procedure

1. Determine the system configuration pattern (config in Table 2) based on the desired neural operations.
2. If global, Set Global Configuration Mode:

{Set A25A24=01;}

If local, Set Local Configuration Mode:
3. If Global

```
{ Assert D15-0 ← Config;
  Assert R/W low signal:
    {CONFIG ← D15-0;}
}
If local
```

```
{ while TRUE
  { determine next layer and config;
    Assert 123-21 ← layer;
    Assert D15-0 ← config;
    Assert R/W low signal:
      {CONFIG_layer ← D15-0;}
    If (configuration done) exit;
  } }
```

This particular address activates the desired address selection lines as shown FIG. 8. The active lines are shown in solid whereas the inactive are in gray tone.

Weight unloading is an operation which copies the synaptic weights from the SynMods 22 to the digital host via bus 16. This operation allows the host to statically store the weights after the learning session. If additional learning is needed for more patterns, the weights may be downloaded to the synapses and further learning session may be carried out. Then, the new weights may be uploaded again. The uploading operation is outlined in Algorithm 4.

Algorithm 3:
Operation-Load weight:

1. Read the system dimensions: L, $N_0, N_i, \ldots N_L$, where $N_i$, is the number of NeuChips in layer "i" and "L" is the number of layers.
2. Execute Procedure-CONFIGURE (Load Weight)
3. Set A25A24=11; Neural Operation Mode
4. Execute the loop:

for (l=1;l=L, l++)

```
{ for (r=1; r=N_l; r++)
  { for (c=1; c=N_{l-1}; c++)
    { for (s=1; s=32; s++)
      { Assert address lines as follows:
          A23-A21 ← layer = 1
          A20-A13 ← row = r
          A12-A5 ← column = c
          A4-A0 ← synapses = s
        Assert data lines as follows:
          D3-D0   ← W_{(32r-31)(32c+s-1)} [l]
          D7-D4   ← W_{(32r-30)(32c+s-1)} [l]
          D11-D8  ← W_{(32r-29)(32c+s-1)} [l]
          D127-D124 ← W_{(32r-0)(32c+s-1)} [l]
        Assert R/W low signal (write cycle)
} } } }
```

Algorithm 4:
Operation—Unload Weight:

1. Read the system dimensions: L, $N_0, N_1, \ldots N_L$, where $N_1$, is the number of NeuChips in layer "i" and "L" is the number of layers.
2. Execute Procedure-CONFIGURE (Unload Weight)
3. Set A25A24=11; Neural Operation Mode
4. Execute the loop:

```
for (l=1;l=L, l++)
  { for (r=1; r=N_l; r++)
    { for (c=1; c=N_{l-1}; c++)
      { for (s=1; s=32; s++)
        { Assert address lines as follows:
            A23-A21 ← layer = 1
            A20-A13 ← row = r
            A12-A5 ← column = c
            A4-A0 ← synapses = s
```

-continued

```
Assert R/W high signal (read Cycle)
Read the weights from the data lines as
follows:
    D3-D0   ← W_{(32r-31)(32c+s-1)} [1]
    D7-D4   ← W_{(32r-30)(32c+s-1)} [1]
    D11-D8  ← W_{(32r-29)(32c+s-1)} [1]
    D127-D124 ← W_{(32r-0)(32c+s-1)} [1]
Assert R/W low signal (write cycle)
} } } }
```

VI.12. Weight Refreshing Mechanism

The refreshing mechanism in this proposal is especially devised to be totally invisible to the system user and the digital host. In contrast to the other procedures, the refreshing procedure runs autonomously by an independent clock, RefClock seen in FIG. 7, and moreover, it runs simultaneously with the recall operations. All other procedures and/or operations run exclusively.

The refreshing cycle is a 3-clock spread and its timing diagram is shown in FIG. 7. The first clock turns RS1, RS2, and RS3 on to flush all internal lines clear of charges. RS2 continues to remain on till the falling edge of the second clock during which SS4 seen in FIG. 3) is turned "on". The two switches, SS4 and RS2, establish a local analog path (RefVolt) from the weight capacitor Cw see FIG. 3 of one Synapse Module 24 to the central tap of all Comps shown in FIG. 7 of the corresponding reference module. Such a path is simultaneously established for all SynMods 24 of one column in all SynChips 12. In other words, at any instant of time, there is exactly one active column of SynMods 24 being refreshed in every SynChip 12. This is due to the replication of the refreshing mechanism in each SynChip 12. Now, as the weight value is being sensed by the Comps, one of these Comps (between whose boundaries the sensed value falls) triggers its pass-transistor 60 shown in FIG. 7 to turn "on". This pass transistor 60 drives the right side of the refresh switch RS1 to the upper boundary (presumably the corrected value) of that Comp. At the trailing edge of the second clock, RS2 turns off releasing RefVolt line. At the rising edge of the third clock, RS1 turns on establishing a return path from the triggered pass-transistor 60 to the weight capacitor Cw. This path excites a weight capacitor Cw to fully charge to the correct value. Finally, at the falling edge of the third clock, all switches are turned off releasing the RefVolt line for the next column refresh cycle.

The sequencing of SS4 is done through the SynConts lines and orchestrating the refreshing switches RS is done through the RefCont lines. The synchronization between SynConts and RefCont lines is done inside the SynLogic block 24. Thus, each SynChip 12 has 32 RefMods 28 which simultaneously refresh the synapsis of the 32 SynMods 22 of one column in one refreshing cycle. It then takes 32 cycles to refresh the entire SynChip 12 (1024 weights). The refresh procedure is outlined in Algorithm 5. Note Again that the procedure autonomously run within the SynChip hardware and is independent of the host.

Because many varying and different embodiments may be made within the scope of the inventive concept herein taught, and because many modification may be made in the embodiments herein detailed in accordance with the descriptive requirement of the law, it is to be understood that the details herein are to be interpreted as illustrative and not in any limiting sense.

What is claimed is:

1. A Hybrid chip-set architecture for artificial neural network systems comprising:
   a) a two chip set based on mixed analog and digital technologies comprising:
      i) a Synaptic Chip having an array of at least 32×32 analog synapse modules, a synapse logic control block, a voltage reference block having at least 16 levels and an array of at least 32 reference modules;
      ii) a Neural Chip having an array of at least 32 analog neuron modules and a neural logic control block, mateingly connectable to said Synaptic chip; and
   a) a DataAdd, bus means for connecting said Neural and Synaptic chips to a host computer.

2. A hybrid chip set architecture for artificial neural network system according to claim 1 wherein said analog synapse modules comprises:
   a) horizontal and vertical analog lines for inputting weighting voltages and outputting currents to other synapse and neural modules and a refresher voltage line for connection to a refreshing module;
   b) a plurality of synapse switches connected to said horizontal and vertical analog lines and said refreshing voltage line;
   c) a synapse switch control block having input from other synapse modules, controlling said synapse switches;
   d) a first voltage multiplier/current generator for providing activation outputs to said horizontal line via a synapse switch;
   e) a buffer connected to said first multiplier to provide a weight value;
   f) a first capacitor for storing weight values in the form of voltages connected to said buffer;
   g) an adder interconnected to said buffer to generate a new weight;
   h) a second voltage multiplier/current generator providing weight update signals connected to said adder;
   i) a second capacitor for maintaining an original value of the weight in the form of a voltage connected to said adder for new weight calculation;
   j) a third capacitor connected to said first and second multiplier for temporarily storing activation values of the weight in the form of voltages when in learning mode;
   k) a third multiplier connected to said horizontal line and said second capacitor for generating error signals; and
   l) a learning factor block connected to said second multiplier/current generator.

3. A hybrid chip set architecture for artificial neural network system according to claim 1 wherein said Neuron modules comprises:
   a) horizontal and vertical analog lines for inputting voltages and outputting currents to other synapse and neural modules;
   b) a plurality of neural switches connected to said horizontal and vertical analog lines;
   c) a neural switch control block having input from other neural modules, controlling said neural switches;
   d) a first current-summing adder connected to said horizonal analog line via a neural switch to accumulate all current values;
   e) a non linear functional block connected to said first multiplier to provide activation signal via a neural switch to said vertical analog line;
   f) a second current-summing adder connected to said vertical analog line via a neural switch to accumulate all back-prorogation error signals;
   g) a multiplier connected to said second adder via a neural switch to generate voltage error signals to said horizonal analog line;

h) a second non-linear function connected to said first adder through a neural switch and to said first multiplier;

i) a capacitor connected to said first adder to temporally store old sum of products;

j) a ADC/DAC conversion block connected to all said neural block through said neural switches to monitor neural values;

k) a databus connected to said ADC/DAC conversion block to transfer data to a digital host;

l) an active by-pass means between said horizontal and Vertical lines for by-passsing said first adder and first non-linear functional block; and m) means for by-passing said second current-summing adder.

4. A hybrid chip set architecture for artificial neural network system according to claim 1 wherein said chip set may be cascaded in regular-grid form to build an ANN of having any arbitrary input,output bandwidth and layer size.

5. A chip set architecture for artificial neural network system according to claim 1 wherein said chip set further comprises unicycle analog on chip learning via graded updates generated and imposed in analog without internal conversion.

6. A chip set architecture for artificial neural network system according to claim 1 wherein said Neural Chip further comprises a NeuLogic block comprising:

a) a rectangular shape having left and right sides;

b) a plurality of I/O lines connected to said host DataAdd bus;

c) a plurality of horizontal control lines located adjacent said left side of said Neural chip, connecting all SynLogic blocks within said Synaptic Chips;

d) a plurality of vertical control lines located adjacent said right side of said Neural Chips connecting all SynLogic blocks within Synaptic chips;

e) a plurality of Scan-In input and Scan-Out output line means for initialization procedures, chained together throughout all said Neural Chips;

f) a "D" flip-flop means for generating proper sequence during initialization procedure connected to said scan-In and scan-Out;

g) a plurality of "AND" gates, generating internal control line signals, connected to said DataAdd bus;

h) a LAY-ROWCOL latch register means connected to said DataAdd bus for storing and decoding embedded addressing information;

i) a plurality of "XOR" gate means for comparing said addressing information with addressing request from said DataAdd bus and generating said Horizontal and Vertical control line signals;

j) a CONFIG register means connected to said DataAdd bus for storing neural configuration information; and k) a decoder means connected to said CONFIG for generating neural control signals.

7. A chip set architecture for artificial neural network system according to claim 1 wherein said Synchip further comprises a SynLogic block comprising:

a) a rectangular shape;

b) a plurality of I/O lines exiting said SynLogic block connected to said host DataAdd bus;

c) a plurality of horizontal control lines exiting said Neulogic block connectable to all SynLogic blocks located horizontally adjacent said SynLogic block;

d) a plurality of vertical control lines exiting said Neulogic block connectable to all SynLogic blocks located vertically adjacent said SynLogic block;

e) a plurality of "AND" gate means connected to said DataAdd bus for generating internal control line signals;

f) a CONFIG register means connected to said DataAdd bus for storing neural configuration information;

g) a logic addressing means connected to internal lines and said Horizontal and Vertical control lines for generating address decoding signals;

h) a logic refreshing means for generating refreshing sequences within each said Synaptic Chip;

i) a plurality of DEC blocks connected to said logic refreshing means generating a plurality of synaptic control line signals each said signal responsible for controlling a plurality of synMod blocks within said Synaptic Chip; and j) at least one said DEC block, generating refreshing control line signals, connected to all RefMod blocks within said SynChip.

8. A chip set architecture for artificial neural network system according to claim 1 wherein said SynChip further comprises a refreshing module comprising:

a) a input/output line Reference Voltage means, connected to a weight capacitor for sensing the voltage on said weight capacitor;

b) a plurality of voltage comparators, each having lower and upper limits, center tab and outputs;

c) a first refreshing switch connecting said input line to each of said center tabs of said comparators;

d) a transmission switch means connected to each said comparators output for bringing said upper limit voltage of said comparators to said refreshing input/output line;

e) a second refreshing switch connecting each of said transmission switches to said Refreshing Voltage means;

f) a means for resetting internal data lines by connecting a third refreshing switch to each of said center taps; and g) a 16-level voltage reference input bus connected to said lower and upper limits of each of said comparators.

9. A chip set architecture for artificial neural networks system according to claim 8 wherein said SynChip further comprises a means for refreshing said synaptic weights during learning process thus eliminating weight degradation during long learning sessions.

10. A method for the assimilation of a neural system for solving non-linear problems in analog signal processing, by utilizing a hybrid chip set having on-board learning comprised of:

a) a two chip set based on mixed analog and digital technology comprising:

i) a Synaptic Chip having an array of at least 32×32 analog synapse modules, a synapse logic control block, a voltage reference block having at least 16 levels and an array of at least 32 reference modules;

ii) a Neural Chip having an array of at least 32 analog neuron modules and a neural logic control block, mateingly connectable to said Synaptic chip; and a) a DataAdd, bus means for connecting said Neural and Synaptic chips to a host computer;

the steps comprising:

a) collecting a plurality of analog activation values from external sensors connected to the analog inputs of said neuron chips of the first layer;

b) distributing the activation values to the synapse chips of the following layer having a matrix of synapse chips each have a matrix of synapse modules and a column of neuron chips each having a column of neuron modules;

c) multiplying each of said activation values by all weight values assigned to individual synapse modules within one column of said synapse matrix within said synapse chip;

d) accumulating the products of said mutiplications of individual synapse modules of every row of said synapse matrix;

e) passing the accumulated values to the corresponding neuron module of said neuron chip within the same layer;

f) summing said accumulated values in every individual neuron module and applying a non-linear function to the sum to produce activation values; and g) outputting the analog activation values from said neuron chips to the synapse matrix of the next layer.

11. A method for the assimilation of a neural system for solving non-linear problems in digital signal processing, by utilizing a hybrid chip set having on-board learning comprising:

a) a two chip set based on mixed analog and digital technology comprising:
i) a Synaptic Chip having an array of at least 32×32 analog synapse modules, a synapse logic control block, a voltage reference block having at least 16 levels and an array of at least 32 reference modules;
ii) a Neural Chip having an array of at least 32 analog neuron modules and a neural logic control block, mateingly connectable to said Synaptic chip; and b) a DataAdd, bus means for connecting said Neural and Synaptic chips to a host computer;

comprising the steps of:

a) collecting a plurality of digital activation values from external sensors connected to the digital inputs of said neuron chips of the first layer;

b) converting all digital values to analog values through individual converters within every neuron module;

c) distributing the activation values to the synapse chips of the following layer having a matrix of synapse chips each have a matrix of synapse modules and a column of neuron chips each having a column of neuron modules;

d) multiplying each of said activation values by all weight values assigned to individual synapse modules within one column of said synapse matrix within said synapse chip;

e) accumulating the products of said mutiplications of individual synapse modules of every row of said synapse matrix;

f) passing the accumulated values to the corresponding neuron module of said neuron chip within the same layer;

g) summing said accumulated values in every individual neuron module and applying a non-linear function to the sum to produce activation values;

h) converting said analog activation values back to digital activation values in said individual neuron modules; and i) outputting the digital activation values from said neuron chips to the synapse matrix of the next layer.

12. An artificial neural network comprising a Hybrid two chip-set expandably designed for juxtaposition progression, said two chip set comprising:

a) a two chip set based on mixed analog and digital technology comprising:
i) a Synaptic Chip having an array of at least 32×32 analog synapse modules, a synapse logic control block, a voltage reference block having at least 16 levels and an array of at least 32 reference modules;
ii) a Neural Chip having an array of at least 32 analog neuron modules and a neural logic control block, mateingly connectable to said Synaptic chip; and a) a DataAdd, bus means for connecting said Neural and Synaptic chips to a host computer;

said two chip set having means for cascading on a conventional grid having arbitrary inputs, output, and/or layer sizes, said two chip set being controlled by analog passive switches in synaptic mode and neuron switches in neural mode, said switches incorporate learning, using same circuits for both recall and learning phase, said chip set having means for combining analog technology with algorithms to provide a self-contained neural processing system and further employs digital circuits to facilitate interface and communications with conventional digital host, provides a complete self-contained chip set for ANN systems based on back propagation model with on-chip learning, provides scalability thereby allowing accommodation of all input/output data sizes and connection to a digital host regardless of bandwidth, includes an embedded global addressing means for eliminating restriction on size of neural systems relative to data transfer bandwidth, utilizes capacitors for storing weights, voltages and up-dated analog signals to weights via analog adders, has a local refreshing means independent of host for updating said weights, further comprise a means for unicycle analog learning through use of weight updates generated and imposed in analog without internal conversion, to reserve full scale accuracy of analog signals without time shared digital components, a continues analog mode means, to allow said digital host to stand off-line while said neural network continues to operate in analog mode, a real-time computation means, having neuron chips which provide both analog and digital representation of both input and output data, to allow direct analog and digital I/O ports to grow correspondingly with a system always operational in full parallelism and a stand-by mode whereby all switches in all synapse and neuron modules are turned off thus providing for power savings.

13. A method for Initialization and configuration of an artificial neural network comprising a hybrid chip set which is a self-contained ANN system for back propagation model, combining both digital and analog technology comprised of a) a two chip set based on mixed analog and digital technology comprising:
i) a Synaptic Chip having an array of at least 32×32 analog synapse modules, a synapse logic control block, a voltage reference block having at least 16 levels and an array of at least 32 reference modules;
ii) a Neural Chip having an array of at least 32 analog neuron modules and a neural logic control block, mateingly connectable to said Synaptic chip; and a) a DataAdd, bus means for connecting said Neural and Synaptic chips to a host computer;

comprising the steps of:

1) Initializing the system each time the system is turned "On" or reset comprising the following steps:
a) resetting the entire "ANN" system whereby all registers are cleared;

b) reading the system dimensions, thereby defining the number of neural chips in each layer and number of layers;
c) setting initialization mode; and
d) executing a loop command which assigns sequential layer, row, and column numbers to all synapse and neural chips for use by the host processor;

2) executing a configuration procedure, to configure all chips in the system to comply with a single mode comprising the steps of:
a) setting configuration of the config. register in a manner whereby the top layer is always designated as the input layer and the next layer as the output layer with all remaining layers hidden;
b) storing all configuration information in config registers capable of performing up to ten neural operations;
c) decoding config bits through both a decoder, and switch control blocks located within a Neural modules block of the Neural Chip portion of a two chip set comprised of a Neural Chip and a SynChip; and
d) decoding config bits through both a decoder, and switch control blocks located within a synapse module block of the SynChip portion of a two chip set comprised of a Neural Chip and a SynChip.

* * * * *

UNITED STATES PATENT AND TRADEMARK OFFICE
CERTIFICATE OF CORRECTION

PATENT NO. : 5,781,702
DATED : July 14, 1998
INVENTOR(S) : Bassem A. Alhalabi and Magdy A. Bayoumi It is certified that error appears in the above-identified patent and that said Letters Patent is hereby corrected as shown below:

On title page, item [19] after Alhalabi add et al after item [76] Inventor: Bassem A. Alhabi P.O. Box 54594, Lafayette, LA 70505 add Magdy A. Bayoumi, 118 Stockton Dr., Lafayette, LA 70506

Title page add [73] assignee: University of South-western LA. Lafayette, LA. 70504

Signed and Sealed this

Third Day of November, 1998

Attest:

BRUCE LEHMAN

*Attesting Officer*    *Commissioner of Patents and Trademarks*